United States Patent
Dayanand et al.

(10) Patent No.: US 12,450,158 B2
(45) Date of Patent: Oct. 21, 2025

(54) SYSTEMS AND METHODS FOR CACHE WARMING IN A DISTRIBUTED DATA STORAGE SYSTEM

(71) Applicant: Stripe, Inc., South San Francisco, CA (US)

(72) Inventors: Kanth Kumar Dayanand, San Jose, CA (US); Kexin Zhu, Santa Clara, CA (US); Shashi Madappa, Campbell, CA (US)

(73) Assignee: STRIPE, INC., South San Francisco, CA (US)

( * ) Notice: Subject to any disclaimer, the term of this patent is extended or adjusted under 35 U.S.C. 154(b) by 97 days.

(21) Appl. No.: 18/501,692

(22) Filed: Nov. 3, 2023

(65) Prior Publication Data

US 2025/0147889 A1    May 8, 2025

(51) Int. Cl.
*G06F 12/0817*    (2016.01)

(52) U.S. Cl.
CPC .................. *G06F 12/0824* (2013.01)

(58) Field of Classification Search
CPC .................................. G06F 12/0824
USPC ........................................... 711/141
See application file for complete search history.

(56) References Cited

U.S. PATENT DOCUMENTS

| | | | |
|---|---|---|---|
| 8,700,570 B1* | 4/2014 | Marathe | G06F 16/1824 707/634 |
| 2018/0139280 A1* | 5/2018 | Zhang | G06F 3/0619 |
| 2020/0233810 A1* | 7/2020 | Kilpatrick | H04L 67/5651 |
| 2021/0124691 A1* | 4/2021 | Jayaraman | G06F 12/0895 |
| 2022/0357958 A1* | 11/2022 | Deokule | H04L 67/10 |

\* cited by examiner

*Primary Examiner* — Jared I Rutz
*Assistant Examiner* — Wei Ma
(74) *Attorney, Agent, or Firm* — Womble Bond Dickinson (US) LLP (57) ABSTRACT

A method and apparatus for cache warming in a distributed storage system is described. The method can include detecting a destructive change to one or more nodes of an existing cluster of cache data nodes. The method can also include allocating a new cluster of cache data nodes in a write-only mode, and streaming data from each cache data node of the existing cluster to cache data nodes of the new cluster. The method can further include servicing a data access request from a selected cache data node of the existing cluster while writing data from the data access request to a selected cache data node of the new cluster. Furthermore, the method can include in response to a determination that data from the cache data nodes of the existing cluster has been successfully streamed to the new cluster, servicing new data access requests with the new cluster.

16 Claims, 8 Drawing Sheets

SYSTEMS AND METHODS FOR CACHE WARMING IN A DISTRIBUTED DATA STORAGE SYSTEM

BACKGROUND

Service provider systems provide various services to user systems over computing networks. The services provided can include commercial transaction processing services, media access services, customer relationship management services, data management services, medical services, etc., as well as a combination of such services. Modern computing techniques employed by many service provider systems typically involve deploying the functions of the service provider systems as distributed services. That is, each service may be responsible for a discreet set of functions, and the services and associated functions operate autonomously or in conjunction with one another as a whole to provide the overall functionality of a service provider system. By dividing the overall functionality of service provider systems in this way, the services may be distributed to different computing systems, multiple instances of the same services used concurrently, etc. to adapt to system load, network connectivity issues, instances of services going down, as well as other technical challenges with implementing distributed service provider systems.

In each of the above service provider systems, users of a service provider system will typically interact with the service provider system via transactions. For example, a user may make a transaction request for one of many types of transactions supported by the service provider system. Then, the one or more of the services of the distributed service provider system will perform functions of the service provider system to implement the originally requested transaction of the user. For example, the transaction may be a financial processing transaction, a media access transaction, a telecommunications transaction, etc., and one or more services of the service provider system are invoked to process a user's requested transaction.

During each of the operations performed by the service provider system during performance of a transaction, the services of the service provider system may generate and store, or seek to access stored, data associated with the service, the transaction, or other data. The data may include data associated with transaction bookkeeping purposes, record keeping purposes, regulatory requirements, end user data, service system data, third party system data, as well as other data that may be generated or accessed during the overall processing of the transaction. The service provider systems may perform millions, billions, or more transactions per hour, day, week, etc., resulting in an enormous scale of data generation and access operations of the services of the service provider system.

To efficiently perform transactions by the services of the service provider system, data accessed by and generated for the transaction by each service can be stored in a distributed cache based storage system. The distributed cache may include one or more data nodes that provide cache storage. Such distributed caching across one or more nodes enables fast data access during transaction processing, which in turn enhance the accuracy and availability of the services using the cached data. However, cache is not persisted on disk and if a node shuts down, gets recycled, a number of nodes changes, or one or more nodes otherwise become unavailable, the data on those node(s) would be lost. The cache storage provided to the services is then no longer "warm". In other words, not all data is available for retrieval by the services of the service provider system via the cached data, potentially resulting in missed cache data access hits for service system data access requests. A service with a cache miss must then go to a persisted backup data storage having a longer access and retrieval time, and a less reliable data access response due to a number of network hops to that network location where the persisted data is stored. Furthermore, while the cache storage is not warm, users of the service are typically informed to expect this degraded performance for a period of time until the cache is once again warm. In modern high availability systems, this period of degraded performance harms the efficiency, accuracy, and operation of the systems that rely on the cached data to perform their functions.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "detecting", "allocating", "initiating", "servicing", "generating", "reconfiguring", "shutting down", "initiating", "streaming", "detecting", "writing", "logging", "reperforming", "transmitting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

Figure 1:
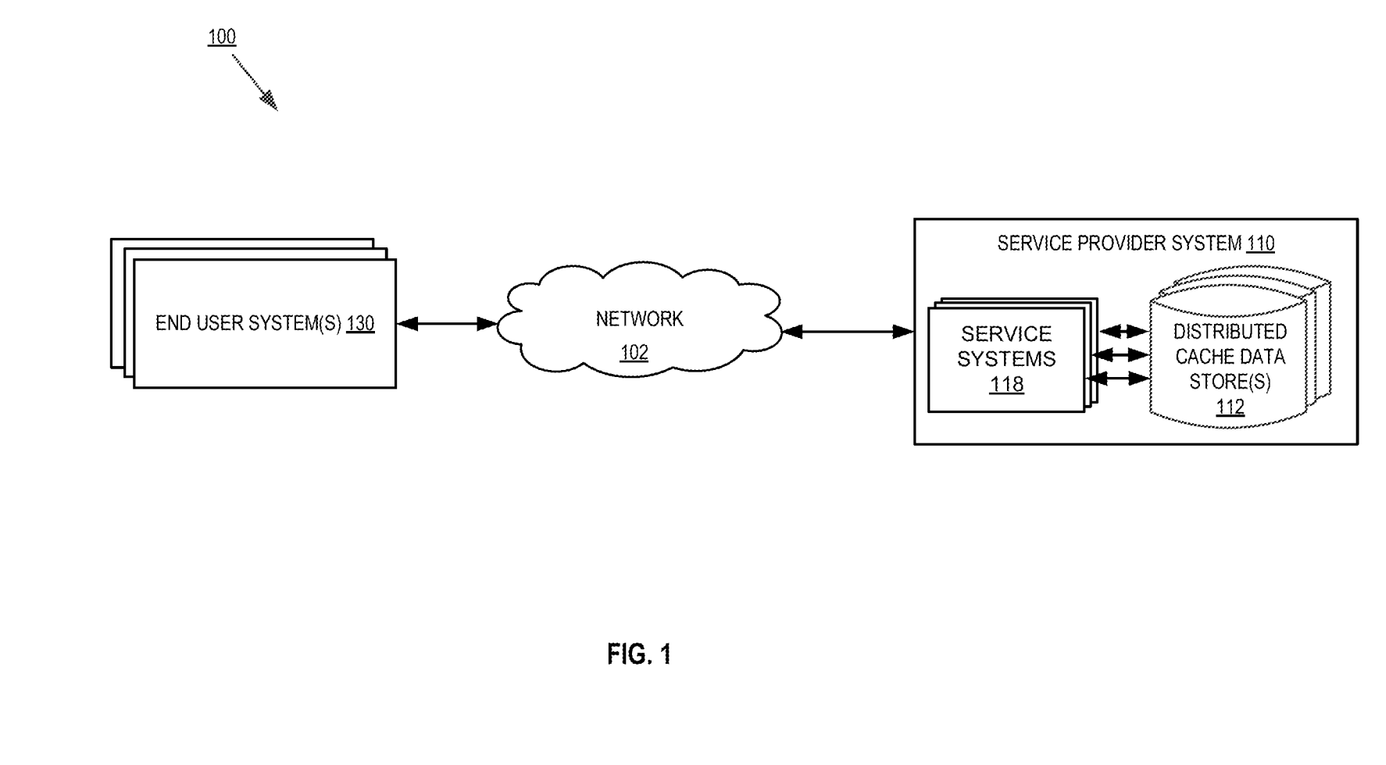
FIG. 1 is a block diagram of an exemplary system architecture for a service provider system that provides zero downtime cache warming for distributed data storage.

FIG. 1 is a block diagram of an exemplary system architecture 100 for a service provider system that provides zero downtime cache warming for distributed data storage. In one embodiment, the system architecture 100 includes service provider system 110 and one or more end user system(s) 130. In one embodiment, one or more of the end user system(s) may be mobile computing devices, such as a smartphone, tablet computer, smartwatch, etc., as well computer systems, such as a desktop computer system, laptop computer system, server computer systems, etc. The service provider system 110 and one or more of the end user system(s) 130 may also be one or more computing devices, such as one or more server computer systems, desktop computer systems, etc.

The embodiments discussed herein may be utilized by a plurality of different types of service provider systems, such as commerce platform systems including payment processing systems, card authorization systems, banks, and other systems seeking to perform zero downtime cache warming, as discussed in greater detail below. Furthermore, any system seeking to store data in a distributed fashion and perform zero downtime cache warming, such as medical information systems, customer relationship management systems, media storage and distribution systems, etc. may use and/or extend the techniques discussed herein. However, to avoid obscuring the embodiments discussed herein, the operations and techniques for cache warming in a distributed storage system may use examples of a commerce platform service provider system to illustrate and describe the embodiments of the present invention, and are not intended to limit the application of the operations and techniques described herein from applicability to other systems.

The service provider system 110 and end user system(s) 130 may be coupled to a network 102 and communicate with one another using any of the standard protocols for the exchange of information, including secure communication protocols. In one embodiment, one or more of the service provider system 110 and end user system(s) 130 may run on one Local Area Network (LAN) and may be incorporated into the same physical or logical system, or different physical or logical systems. Alternatively, the service provider system 110 and end user system(s) 130 may reside on different LANs, wide area networks, cellular telephone networks, etc. that may be coupled together via the Internet but separated by firewalls, routers, and/or other network devices. In one embodiment, service provider system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, service provider system 110 provides financial processing services to one or more merchants, such as end user system(s) 130. For example, service provider system 110 may manage merchant accounts held at the commerce platform, run financial transactions initiated at end user system(s) 130, clear transactions, performing payouts to merchant and/or merchant agents, manage merchant and/or agent accounts held at the service provider system 110, as well as other services typically associated with commerce platforms systems such as, for example, STRIPE™. Each of these functions may be carried out by one or more service system(s) 118 of the service provider system 110. That is, service provider system 110 divides the services it provides to end user among one or more service systems(s) 118 so that the processing of the services may be distributed. Such distribution of service processing enables service provider systems to scale based on load, demand, hardware issues, geographic needs, expanded service offerings, as well as for other reasons.

In embodiments, end user system(s) 130 access the services of service provider system 110 by network based messaging, such as application programming interface (API) based messaging where remote calls of end user system(s) 130 request a service by messaging the request to one or more of the service systems 118. The service systems 118 in turn, and in order to execute the requested service, may generate messages to other service systems 118, generate data associated with the requested service that is stored in distributed cache data store(s) 112, access data stored in distributed cache data store(s) 112 that is needed to process the requested service, or a combination of such operations. Thus, each requested service operation generates, stores, accesses, write, deletes, modified, or otherwise interacts with data stored at the distributed cache data store(s) 112.

Furthermore, such data may originate from the end user system(s) 130 (e.g., user supplied data) and/or may be data associated with a requested service that is generated by a service system 118 (e.g., service generated/supplied data).

Service provider system 110 provides numerous services to end user systems(s) 130. For example, where service provider system is a commerce platform, the services may include running financial transactions for merchant end users, managing agent accounts of merchants, performing tax accounting services as a result of the various financial transactions, performing data control and management of merchant data, providing platform hosting services, as well as any other such services. Each of these services may be initiated at the request of an end user system 130, by another service 118, or a combination thereof. Furthermore, end user system(s) 130 may include a plurality of end user systems(s) that as a whole invoke the services of server system(s) 118 on the scale of millions, hundreds of millions, billions, or more service transactions per hour, day, etc. Therefore, the amount of data generated by the service systems(s) 118 is very large, and the number of data accesses by the service systems 118 is also very large. Because of this scale, in embodiments, service provider system 110 employs a distributed data storage system that utilizes in-memory cache data, illustrated as distributed cache data store(s) 112.

In embodiments, distributed cache data store(s) 112 is cache memory of a distributed data storage system, such as the Memento$^{TM}$ data storage system. The distributed cache data store(s) 112 are cache storage where data accesses (e.g., data being generated and stored, read, overwritten, etc.) are processed from the distributed cache data store(s) 112. In some embodiments, the distributed cache is a pool of random access memory (RAM) of multiple physical resources (e.g., computing systems that implement the service systems 118) that serves as an in-memory data store to provide fast access to the data stored within the distributed cache data store(s) 112. Furthermore, the use of a cache data storage system reduces network bandwidth consumption, as data accesses are performed directly with cache memory, and not as calls/responses to/from remote database systems. For systems, such as service provider system 110 that operates at scale, the use of distributed cache data store(s) 112 to manage data accessed by the service systems 118 is therefore both beneficial to end user system(s) 130 and service systems 118 as data access requests may be handles more quickly and use less network bandwidth.

As will be discussed in greater detail below, the volume of data stored by distributed cache data store(s) 112 and the scale of data accesses by the service systems 118 is very large, and the proper and efficient functioning of the service systems 118 is often predicated on their ability to access the data stored in the cache data store(s) 112 in a timely manner. Sometimes, however, a problem may arise with one or more nodes of the distributed cache data store(s) 112, such as a request by a service system 118 to increase or decrease the number of nodes, recycling entire cache clusters to enable maintaining security compliance when recycling/rebooting cloud computing machines, a required rebooting of an entire cache cluster to apply a security or operating system patch, or other issues that are destructive to one or more nodes of an existing cluster of cache data nodes associated with a service system. When a destructive event is detected or scheduled, new clusters of cache data nodes are allocated, and then warmed to include all of the data stored by the old cluster of cache data nodes. Once warmed, the new cluster of cache data nodes may be used to service the data access requests of the service system 118.

In embodiments, rather than taking the old cluster offline and performing warming offline, which will make data access requests during this warming time less reliable (e.g., increasing a number of network hops to persistent storage), less efficient (e.g., the greater the number of hops increase overall data access round trip time), and more network bandwidth intensive (e.g., the greater the number of hops, the more congestion is added to the service provider system's 110 network), embodiments discussed herein provide a zero downtime cache warming process that resolves each of these technical deficiencies. As will be discussed in greater detail below, whenever a cluster of cached data nodes is subject to a destructive event, a dumping process performed on an old cluster is initiated. This dumping process moves data from the old cluster to one or more new clusters of cache data nodes while at the same time servicing data access requests for a service system 118.

In embodiments, as discussed in greater detail herein, the dumping process allocates the one or more new clusters in a write-only mode so that they do not receive any new data read traffic during the warming process, the data access traffic including read/write requests of a service system 118 are serviced by redundant nodes of an old cluster. During the warming process, a parallel streaming of existing cache data to new cluster(s) from an old cluster is performed, while forwarding data access write operations to both the old and new clusters and while continuing to service read requests from the old cluster. That way, there is zero downtime as the service system data access requests continues to use the old cache in a cache cluster not subject to the destructive event, the new cache cluster is warmed and adds any new data received (e.g., part of a write request) during the warming process. When the streaming is complete (and optionally verified), the new cache data nodes are warm, and read and write data access requests can be forwarded to the new cluster(s) of cache data node, and the old cluster taken down and recycled. These operations ensure improved data access by eliminating the period of downtime while the new cluster(s) is/are being warmed, reliability by not introducing additional network hops (e.g., potential points of failure) to access data during the warming process, and efficiency by eliminating the need to contact persistent storage during the warming process, before, during, and after the allocation and warming process.

Figure 2:
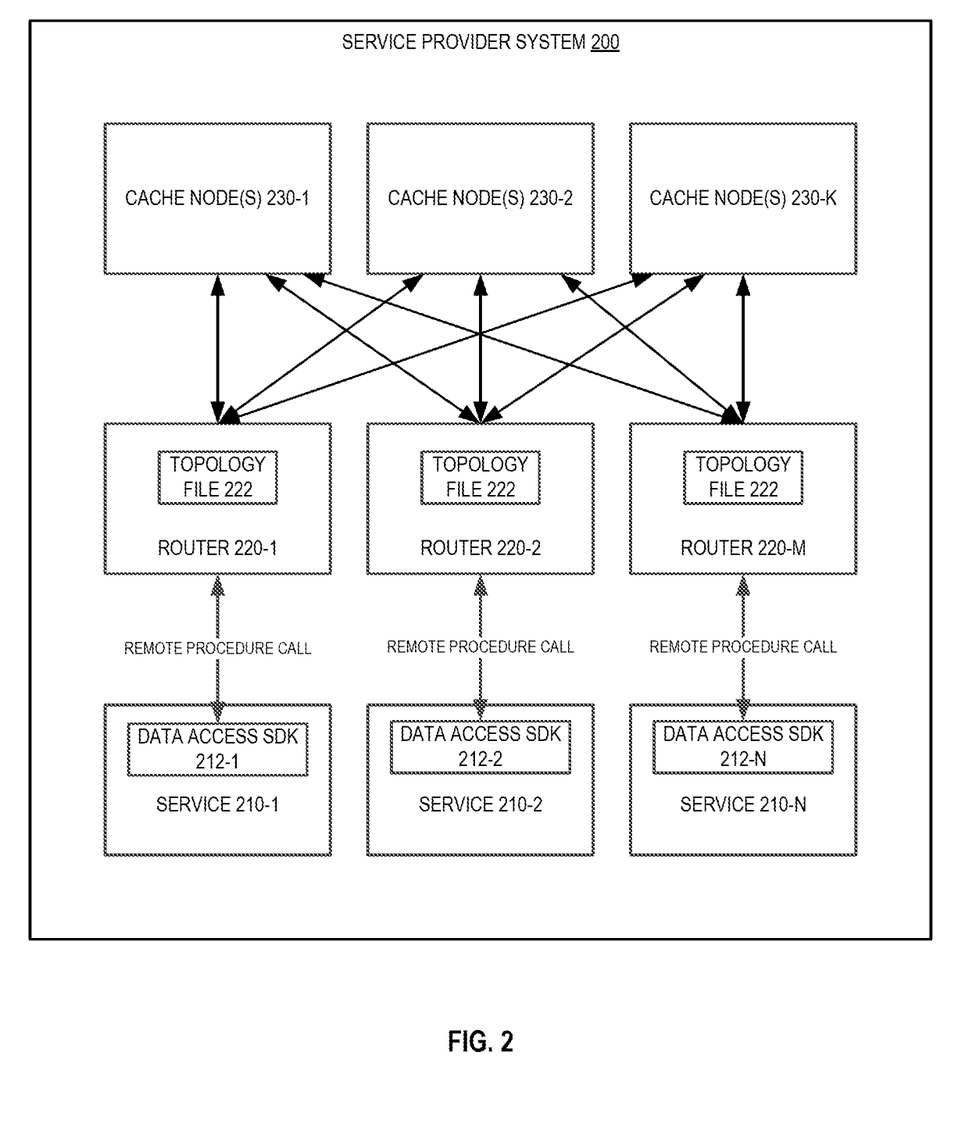
FIG. 2 is a block diagram of one embodiment of a service provider system architecture for services accessing cache data nodes via routers.

FIG. 2 is a block diagram of one embodiment of a service provider system 200 architecture for services accessing cache data nodes via routers. Service provider system 200 provides additional details for the service provider system 110 discussed above in FIG. 1.

In one embodiment, service provider system 200 includes a plurality of services (e.g., services 210-1, 210-2, through 210-N), a plurality of routers (e.g., routers 220-1, 220-2, through 220-M), and a plurality of cache data nodes (e.g., nodes 230-1, 230-2, and 230-K). The services and routers, in embodiments, are performed by processing logic that may comprise hardware (circuitry, dedicated logic, etc.), software (such as is run on a general purpose computer system or a dedicated machine), firmware, or a combination. The cache data nodes are in-memory RAM of the physical resources used to implement the services, routers, a data or computing center at which the services and routers are implemented, etc. Furthermore, in embodiments, the cache data nodes may further include logic to respond to and execute data access requests, for example those originating from the services.

Each service 210 is responsible for executing one or more functions of the service provider system 200. For example, a service 210 may respond to an end user request or command (not shown), a request or command of another service, a periodic and automatic job executed by the service, as well as other operations. As part of executing the function, the service 210 will access a data access software development kit (SDK). The data access software development kit (SDK) 212 is a set of data access functions that enable the service to read, write, or otherwise interact with data. The data access SDK may define one or more API function calls, such as get, post, put, delete, etc. that are used by the service 210 when seeking to access data of the service 210. Such function calls may be part of a data access software library, such as that provided by the Memento™ distributed data storage system.

In embodiments, service system data, such as that accessed by services 210-1 through 210-N, is stored in a distributed cache. In embodiments, the distributed cache includes cache node(s) 230-1 through 230-K. Each of the cache node(s) 230-1 through 230-N may include one or more nodes and be part of a zone or cluster of cache nodes, such as each of the cache node zones includes multiple machines providing in-memory storage at a geographic region, data center, etc. Furthermore, each cache node or cluster of cache nodes in different zones may be single tenancy cluster of cache nodes, where only data of a specific service, specific end-user system, etc. are stored within the cache node or cluster of cache node(s). In embodiments, data stored for a service or end user may be distributed amongst the node(s) in each cluster and associated with that end user/service, and duplicate data maintained in redundant cache node(s) of other clusters, to ensure constant availability of data. For example, in some embodiments, the clusters of cache data node(s) provide redundant storage in each of a plurality of zones to ensure high availability of the stored data. Many node and/or cluster configurations are possible with the embodiments discussed herein.

The machines providing the cache node(s) 230 associated with one or more clusters are physical machines, virtual machines executing on a single physical machine, as well as a combination thereof. For example, a web services provider system (e.g., AMAZON WEB SERVICES™, MICROSOFT AZUL™, GOOGLE CLOUD™, IBM CLOUD™, etc.) may provide physical computing resources for services 210 and associated cache memory is pooled from those physical resources for cache node(s) 230. Each cache node 230 is therefore locatable by an identifier of the cache node, such as an internet protocol (IP) address of the cache node, indicating a location within the web services provider system's physical resources where data is stored.

In an embodiment, the cache nodes 230 provide data storage for the services 210, as discussed herein. Each cache node may store data in a tabular form, as well as other forms, accessible or indexed by data key (e.g., a value derived from or assigned to data). Then, data accesses may be implemented as key based data access requests, generated by the data access SDKs 212, with the data values locatable within the cache node(s) 230 by the associated keys. If implemented as tabular data stores, the keys may be arranged as rows of tabular data, with the associated data values of each key stored in a column for a given key's row. Then, in embodiments, a data access request generated by a data access SDK 212 may be serviced based on an IP address where data is stored and a key value of the data associated with the request.

In embodiments, routers 220 are systems in between the cache nodes 230 and the services 210. Each router 220 includes routing logic, such as the Memento™ memrouter logic, that determines where data is stored amongst the cache nodes based on topology files 222. Each topology file 222 stores, for each service and/or end user, an ordered set of IP addresses of the cache nodes where data is stored for that service/end user. Furthermore, the topology file 222 at each of the routers 220 is the same to ensure consistent routing decisions among the routers. The ordered set is predefined, includes the number of cache nodes used by the service/end user, and identifies each cache node by IP address within the given ordering. With the ordered listing of IP addresses of the cache nodes and the total number of nodes, a deterministic data distribution technique, such as the jump hash technique, is able to repeatedly calculate, based on a key and total number of nodes for a service/end user, which node in the ordered listing data to be accessed is stored at. That is, a key value and a number of nodes is input into the jump hash, which outputs a deterministic node selection. For example, if there are 3 cache nodes associated with a service, and a key value of 1234 is input with the total number of nodes, the jump hash technique will always return the same resulting node, such as node 2 for the combination of key and number of total cache nodes. The cache node associated with the position can then be used to determine it's IP address, and the associated storage location of the data associated with the key. Furthermore, the jump hash technique performs regular distribution, so that data written to nodes is distributed in an even fashion. Therefore, the topology file is a configuration (e.g., mapping of each service/end user (e.g., key, ID, name, etc.) to their cache nodes (IP address, clusters, regions, etc.) for handling data access requests.

Figure 3A:
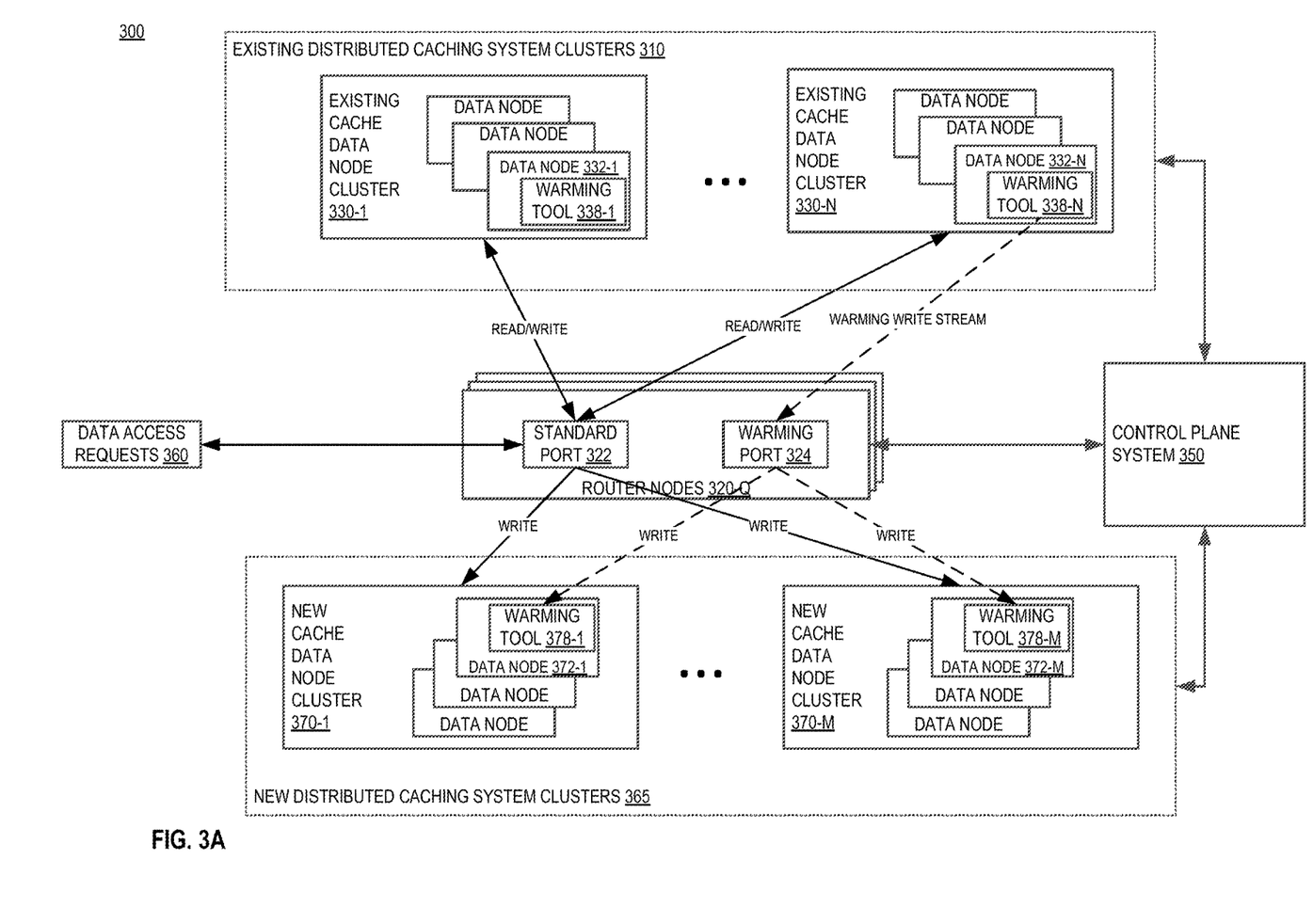
FIG. 3A is a block diagram of one embodiment of a process for warming a new distributed caching system cluster while servicing a data access request.

In embodiments, one or more of the cache nodes may be subject to a destructive event or planned to be subject to a destructive event at a future time. While typically this would disrupt and downgrade performance of the distributed storage system and the service system that use the distributed storage, in embodiments, a zero downtime cache warming process is performed to eliminate those issues. FIG. 3A is a block diagram of one embodiment of a process 300 for warming a new distributed caching system cluster while servicing a data access request. The process 300 is performed by processing logics that may comprise hardware (circuitry, dedicated logic, etc.), software (such as is run on a general purpose computer system or a dedicated machine), firmware, or a combination. In one embodiment, the process 300 is performed by processing logic executed at the illustrated clusters, data nodes, routers, and control plane system.

As illustrated in FIG. 3A, control plane system 350 is included. Control plane system 350 is a computing system that manages the distributed caching system 300 of the service provider system. For example, among other management tasks, control plane system 350 monitors the existing cache data node clusters 330-1 through 330-N, and the cache data nodes 332-1 through 332-N within those clusters, including the status, health, and planned events that impact the operation of the nodes and clusters of the existing distributed caching system clusters 310. Based on the detection or planning of a destructive event, such as a health report showing a node in a cluster is down or unhealthy, that a software update is planned that will take a node or cluster down, a recycling event is planned, a service system has requested to scale up or scale down the number of nodes in each cluster, etc., the control plane system 350 initiates a zero downtime cache warming process.

In embodiments, control plane 350 allocates new distributed caching system clusters 365, which include new cache data node clusters 370-1 through 370-1, with each cluster including data nodes 372-1 through 372-M. In embodiments, the number of data nodes and/or clusters at new distributed caching system clusters 365 may be the same or different to that of clusters 310. For example, an outage of a node may cause the warming of a similar number of clusters and nodes within a cluster, whereas a service system request to scale up a number of clusters may result in clusters 365 including more clusters (e.g., M>N) and/or more nodes within each of clusters 370-1 through 370-M.

Each of the data nodes 372 in the new caching system cluster 365 is initially configured in a write-only mode. That is, each cluster 370 and data node 372 in the new distributed caching system clusters 365 will only accept and perform write requests. This ensures data security in that the new clusters 365 are not subject to unexpected or nefarious write requests.

Once allocated, control plane 350 initiates a data dumping process at warming tool 338-N of data node 332-N within existing distributed caching system clusters 310, and at each warming tool 378-1 through 378-M of the clusters of new distributed caching system clusters 365. Warming tool 338-N is instructed to start a streaming of existing data from the data nodes 332-N of data node cluster 330-N to warming port 324 of router nodes 320-Q. The warming port is a communications port configured on the router nodes to only accept warming write stream traffic from the warming tool 338-N. Any additional traffic is blocked or rejected by warming port 324. Warming port 324 therefore implements a data security measure in that non-warming traffic (benign or nefarious) is rejected by warming port 324 to prevent such non-streaming traffic from being streamed to warming tools 378-1 though 378-M. The warming write stream is a stream of data (e.g., key, value data pairs) that streams each piece of data stored by data nodes 332-N, such as by sequentially or otherwise advancing through rows of tabular data stored within the data nodes 332-N. The stream is a stream of write requests, including the key and value of data to be written, forwarded from warming port 324 to each of warming tools 378-1 through 378-M.

Warming tools 378-1 through 378-M each receive the write request (e.g., key, value data) and write the data to their cache data storage, such as distributed to the one or more data nodes of each cluster. It should be noted that each new cache data node cluster, such as cache data node cluster 370-1, includes one or more data nodes, and each data node includes a warming tool 378. Thus, router nodes may distribute data, using a deterministic approach to the nodes 372 of each cluster, and warming tool 378 performs the writing of that warming data as a key-value write request.

In embodiments, data access requests, such as data access request 360 may be received and processed during the warming process while existing data is streamed from the nodes of existing cache data node cluster 330-N to the nodes of each of new cache data node clusters 370-1 through 370-M. The data access request 360 is received at a standard port 322 of router nodes 320-Q. However, in embodiments, control plane system 350 further configures that data access requests that are write requests to be forwarded to each to the cached data node clusters of the existing distributed caching system clusters 310 and the new distributed caching system clusters 365. This ensures that any new data access requests seeking to write data are written to both the new and old clusters 310 and 365. This ensures that the clusters 365 being warmed receive both the existing data via the warming write stream, as well as any new data (e.g., data access request 360) received after the initiation of the cache warming process.

In embodiments, standard port 322 is configured by control plane system 350 to only forward read data access requests to the existing cache data node clusters 330-1 through 330-N, as read requests are not serviced by the new distributed caching system cluster 365 until after completion of the warming process. That is, the existing distributed caching system clusters 310 continue to service the data access requests via the redundant existing cache data node clusters 330 during the warming process.

When all data is streamed from the data nodes 332-N of existing cache data node cluster 330-N to new cache data node clusters 370-1, one or more testing processes may be performed, as discussed below. The existing distributed caching system clusters 310 is then turned off and deallocated by control plane system 350, while the new distributed caching system clusters 365 is turned on and router nodes 320-Q are configured to have standard port 322 forward all data access requests (i.e., read and write) to the new distributed caching system clusters 365.

As discussed above, the new distributed caching system clusters 365 exists for a period of time with the existing distributed caching system clusters 310 to enable the warming of the data nodes of the new distributed caching system clusters 365. Furthermore, any write requests received during the warming processing are forwarded to both the existing distributed caching system clusters 310 and the new distributed caching system clusters 365 to ensure that the new distributed caching system clusters 365 is provided with all data relevant to a service (e.g., the existing data and newly received data). As a result, the warming processing may be performed without service degradation to the service systems that rely on access to the cache data storage. Additionally, because both the existing distributed caching system clusters 310 and the new distributed caching system clusters 365 remain active during the warming processing, data misses that would otherwise be encountered by a service system are avoided, and the data access and reliability of the caching data platform is maintained despite the occurrence of a destructive event.

Figure 3B:
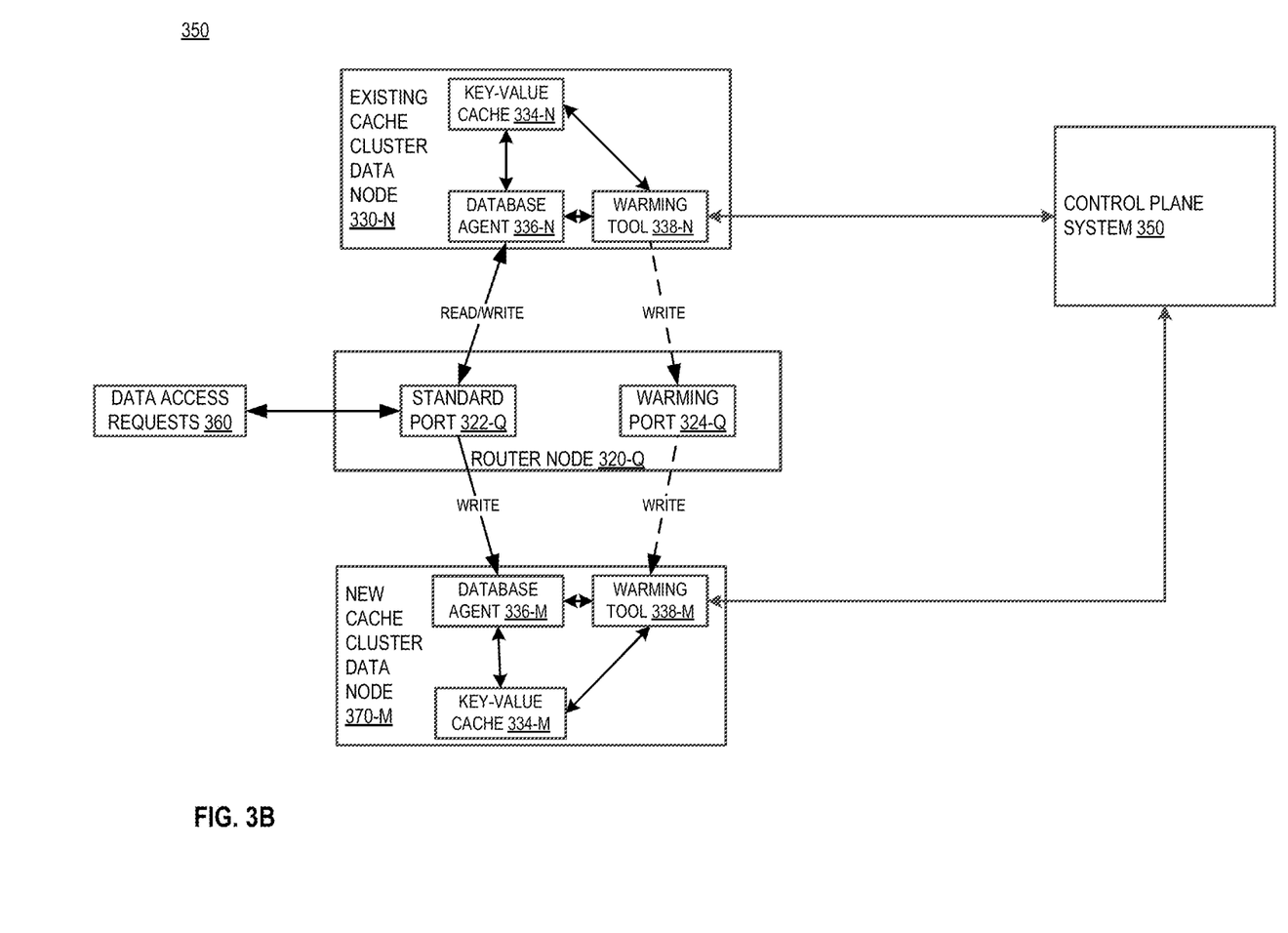
FIG. 3B is a block diagram of one embodiment of a process for cache warming by an existing data node, a new data node, and a router node of a service provider system while servicing a data access request.

FIG. 3B is a block diagram of one embodiment of a process for cache warming by an existing data node, a new data node, and a router node of a service provider system while servicing a data access request. The process 300 is performed by processing logics that may comprise hardware (circuitry, dedicated logic, etc.), software (such as is run on a general purpose computer system or a dedicated machine), firmware, or a combination. In one embodiment, the process 300 is performed by processing logic executed at a router node 320-Q, existing cache cluster data node 330-N, new cache cluster data node 370-M, and control plane system 350.

In response to a destructive event that will impact nodes of an existing distributed caching system clusters, control plane system 350 instructs warming tool 338-N to initiate a warming process data stream. The instructions, in embodiments, identify warming port 324-Q of router node 320-Q as a location were warming write requests are to be sent. Control plane system 350 further allocates one or more new cache cluster data nodes, such as node 370-M in a new distributed caching system cluster, and informs warming tool 338-M to accept write requests from warming port 324-Q. In embodiments, a MEMENTO™ side car service is executed on the router node 320-Q to process the write stream via warming port 324-Q and standard read/write requests received at standard port 322-Q during the warming process, as discussed herein.

In embodiments, warming tool 338-N then initiates the streaming of data as a series of write request via warming port 324-Q to warming tool 338-M. In embodiments, warming tool 338-N instructs database agent to access data in key-value cache 334-N. For example, where a key-value cache is maintained as a tabular data store, database agent 336-N accesses each row of the key-value ache 334-N, and for each row generates a write request including the data key and the data value from the row. This sequence of data write requests form a stream of write requests sent to warming tool 338-M via warming port 324-Q.

Warming tool 338-M receives the stream of write requests and provides them to database agent 336-M. Database agent then attempts to write the data to a key-value cache 334-M of the new cache cluster data node 370-M. In embodiments, to avoid overwriting data, only data whose key does not already exist in cache 334-M is written to new cache cluster data node 370-M.

In embodiments, failed write(s) at new cache cluster data node 370-M may be logged, and the log provided to control plane 350 by warming tool 338-M. The log serves to identify any data not streamed to the new cache cluster data node 370-M, and therefor identifies missing data. In embodiments, the log showing one or more failed write operations, such as a key value associated with a failed write, may then be forwarded from control plane system 350 to warming tool 338-N to attempt to write the missing data. This process of identifying and attempting to rewrite missing data may be performed a preset number of times or until the failed write log is empty.

In embodiment, data access request 360 may be received at any point during the warming process. This is a non-warming data access request, and is therefore received at standard port 322-Q. When the data access request 360 is a write request, it is forwarded to both data base agents 336-N and 336-M to ensure both nodes 330-N and 330-M store all data associated with a service system.

In embodiments, prior to handing off the data access request servicing from existing cache cluster data node 370-N to new cache cluster data node 370-M, one or more tests on the new cache cluster data node 370-M (e.g., the new distributed caching system cluster of which new cache cluster data node 370-M is a part).

In embodiments, a simultaneous test may be performed for a period of time. During the simultaneous testing, both nodes 370-N and 370-M are configured by control plane 350 to be in a read-write mode, and serve data subject to read-write data access request when selected by router node 320-Q. Furthermore, control plane 350 may instruct router node 320-Q to split data access requests between new and existing clusters. Metrics are collected by the warming tool 338-M and the warming tool 338-N to compare failure rates, latency, and other performance indicators to ensure the new cluster including data node 370-M is operating consistent to the old cluster including data node 370-N. The information may be shared between warming nodes 338-N and 338-M, or with control plane 350, to enable warming tool 338-M and/or control plane 350 to determine that a newly warmed cluster is operating within the old cluster's tolerances. The traffic distribution by standard port 322-Q is random, and therefore the types and volume of requests processed by each cluster (e.g., old and new) should match statistically, enabling the comparison of operational tolerances of servicing data access requests by the existing and new clusters of cache data nodes.

In some embodiments, a capacity test of a new cluster including data node 370-M may also be performed. In embodiments, warming tool 338-M request that control plane 350 implement this test by configuring the new cluster in a read/write mode, and the old cluster in a write only. Then the old and new clusters perform operations similar to the streaming discussed above, except the modes are flipped between systems and the capacity of the new cluster to handle a full data access volume is tested, while streaming new data writes to the old cluster. This enables a capacity test of the new cluster, but updates the old cluster during the test. In the event the new cluster cannot handle a full volume of data access request, the forwarding of any new data writes during the capacity test enables the old cluster to be reinstated. This way, the new cluster can be vetted or pressure tested for a period of time to ensure the new cluster including node 370-M can handle one hundred percent of the traffic, with a cache miss or failure rate at a preset threshold, at a same rate as an old cluster, etc.

The testing processes, in embodiments, may be performed sequentially. For example, the simultaneous testing may be performed first, and when passed, the new cluster capacity testing can be performed. Alternatively, a test type may be selected by, for example warming tool 338-M, control plane system 350, or an operator (not shown), based on one or more metrics associated with a new cluster, such as expected data access volume, number of nodes, etc. In either embodiment, if either test fails by generating an unsatisfactory result, control plane system 350 deallocates the new cluster including data node 370-M and restarts the warming process. Therefore, the testing processes ensure the correctness and completeness of the new cluster including data node 370-M, as well as the ability of the new cluster to handle a full volume of data access traffic, before fully handing over caching data servicing to the new cluster. This testing further eliminates the potential for downtime and degraded performance experienced by service systems.

In embodiments, the cache warming process is stateless. For example, the warming of a cache cluster, as well as service deployment and router recycling, does not impact other cache clusters. Furthermore, in embodiments, write requests during warming, as discussed herein, are sent to both the old and new cluster using a putIfAbsent operation, which avoids tracking any state and overwriting already existing keys in the new cluster. Thus, external factors do not impact warming process.

Figure 4:
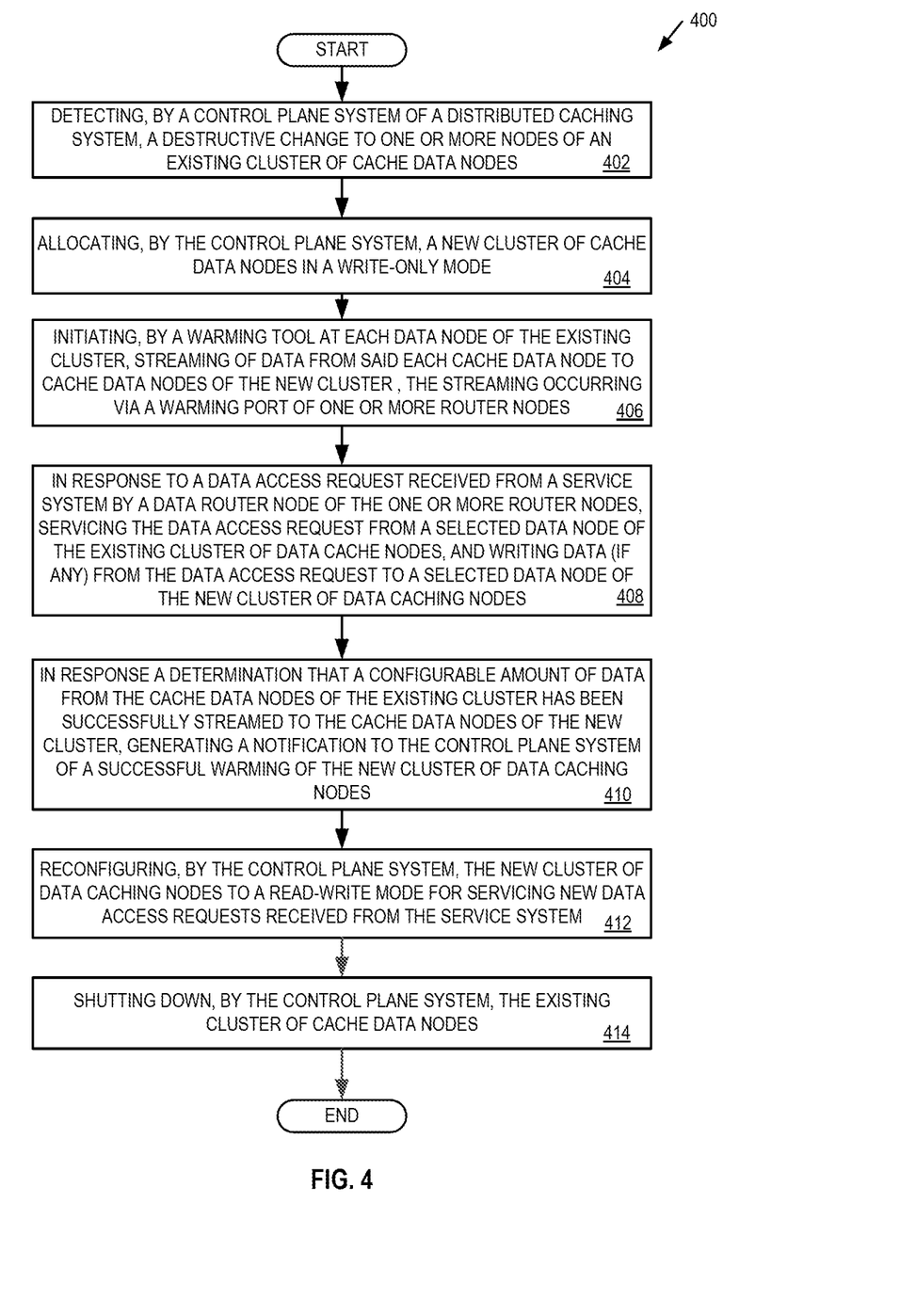
FIG. 4 is a flow diagram of one embodiment of a method for warming cache storage of a distributed cache storage system with zero downtime.

FIG. 4 is a flow diagram of one embodiment of a method for warming cache storage of a distributed cache storage system with zero downtime. The method 400 is performed by processing logic that may comprise hardware (circuitry, dedicated logic, etc.), software (such as is run on a general purpose computer system or a dedicated machine), firmware, or a combination. In embodiments, the process is performed by a distributed caching system of a service provider system.

Referring to FIG. 4, processing logic begins by detecting, by a control plane system of a distributed caching system, a destructive change to one or more nodes of an existing cluster of cache data nodes (processing block 402). The destructive change is a change that will disrupt the operation of one or more nodes of a distributed caching system. For example, requests to spin up or down a number of nodes, a periodic recycling, a node crash, a node planned to be taken offline for a software update, etc.

Processing logic allocates, by the control plane system, a new cluster of cache data nodes in a write-only mode (processing block 404). The new cluster may be the same size or different from the old cluster. However, the nodes of the new cluster are in a write-only mode so that streaming can be performed as discussed herein.

After allocating the new cluster of cache data nodes, processing logic initiates by a warming tool at each data node of the existing cluster, streaming of data from said each cache data node to cache data nodes of the new cluster, the streaming occurring via a warming port of one or more router nodes (processing block 406). The streaming, as discussed herein, transfers the data contents of the cache data nodes of the existing cluster to the new cluster of cache data nodes. In embodiments, this is accomplished by a stream of write requests, each having a key and a value of data associated with that key. Furthermore, the stream may be associated with rows of tabular data maintained at each node of an existing cluster of data nodes. Furthermore, in embodiments, the streaming occurs via a specifically configured warming port. The warming port may enforce data security by rejecting any data access requests not part of the stream (e.g., a data read, a write received from a different cluster or system, etc.).

In response to a data access request received from a service system by a data router node of the one or more router nodes, processing logic services the data access request from a selected data node of the existing cluster of data cache nodes, and writing data (if any) from the data access request to a selected data node of the new cluster of data caching nodes (processing block 408). In embodiments, the warming discussed herein is a zero downtime process. Thus, a data read request may be services from an existing cluster during the warming process. Furthermore, a data write request is stored in one or more nodes of an existing cluster and a new cluster to ensure both the existing and new clusters have a consistent, accurate, and up-to-date view of the data of the cluster.

In response a determination that a configurable amount of data from the cache data nodes of the existing cluster has been successfully streamed to the cache data nodes of the new cluster, processing logic generates a notification to the control plane system of a successful warming of the new cluster of data caching nodes (processing block 410). In embodiments, a warming tool may keep a failure log to track a number of failed writes in comparison to an overall data volume written to one or more new nodes. In some embodiment the configurable amount is a number of write failures, a percentage of the overall written volume, or other value. Processing logic can therefore use the failure log to determine if warming has been successful, and to ensure sufficient completeness of the warming data transfer to provide sufficient guarantees against later service system data access misses.

Processing logic then reconfigures, by the control plane system, the new cluster of data caching nodes to a read-write mode for servicing new data access requests received from the service system (processing block 412), and shuts down, by the control plane system, the existing cluster of cache data nodes (processing block 414).

Figure 5:
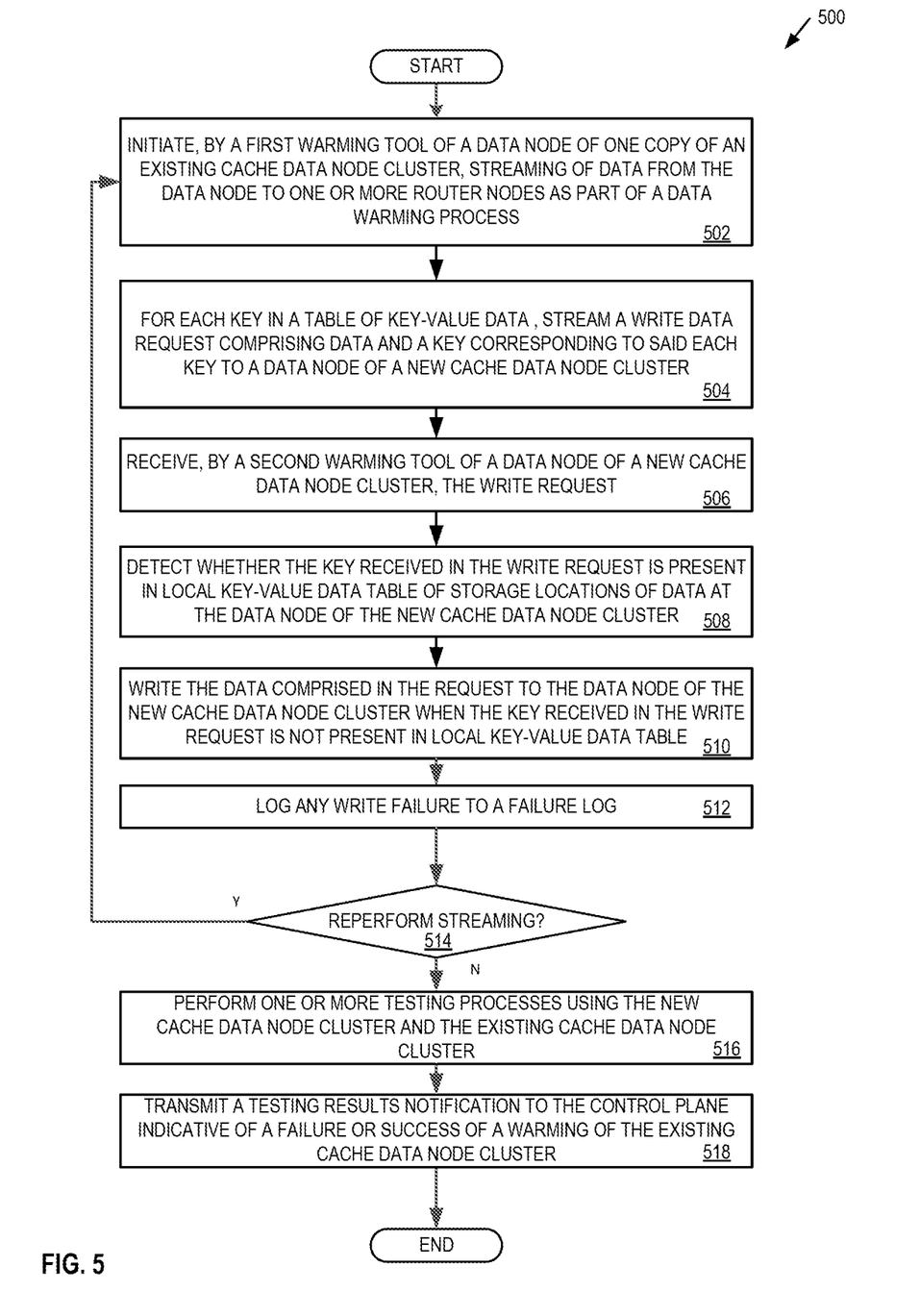
FIG. 5 is a flow diagram of another embodiment of a method for warming cache storage of a distributed cache storage system with zero downtime.

FIG. 5 is a flow diagram of another embodiment of a method for warming cache storage of a distributed cache storage system with zero downtime. The method 500 is performed by processing logic that may comprise hardware (circuitry, dedicated logic, etc.), software (such as is run on a general purpose computer system or a dedicated machine), firmware, or a combination. In embodiments, the process is performed by a distributed caching system of a service provider system.

Referring to FIG. 5, processing logic begins by initiating, by a first warming tool of a data node of one copy of an existing cache data node cluster, streaming of data from the data node to one or more router nodes as part of a data warming process (processing block 502). The data nodes is part of a cluster, which one of a set of redundant clusters. Because of this redundancy, only a single cluster need perform streaming to a new set of clusters during a warming process. That is, the streaming process is a one to many where a healthy existing cluster (from the set of existing clusters) is used to stream data from the nodes of that cluster to all nodes of a new cluster as shown and illustrated herein.

For each key in a table of key-value data, processing logic streams a write data request comprising data and a key corresponding to said each key to a data node of a new cache data node cluster (processing block 504). As discussed herein, cache data nodes may be implemented as key-value data stores that store data in tabular form. Thus, a table may be processed sequentially by accessing each key, obtaining the associated data value, and streaming a write request for the key-value pair of data.

Processing logic receives, by a second warming tool of a data node of a new cache data node cluster, the write request (processing block 506). Processing logic then detects whether the key received in the write request is present in local key-value data table of storage locations of data at the data node of the new cache data node cluster (processing block 508). This check is performed by processing logic to prevent overwriting or duplicating existing data. That is, if there is already an entry in a cache data node with a key value, then processing logic an assume the data has already been written and need to be added or overwritten.

Processing logic therefore writes the data comprised in the request to the data node of the new cache data node cluster when the key received in the write request is not present in local key-value data table (processing block 510). In embodiments, the write includes adding the data by key and value to a data table at a data node of the new cluster. Processing logic further logs any write failure to a failure log (processing block 512). Processing logic uses the failure log to determine whether to reperform streaming (processing block 514). When a failure log is not empty, has a number of entries exceeding a set amount (e.g., number of failures >=X), has a number of entries exceeding a total storage volume (e.g., number of failures >=% number of total entries stored), or some other configurable indicator, processing logic returns to processing block 502 to reperform the warming process. In embodiments, this can include deallocating and/or recycling the data nodes and clusters of the failed warming process.

In some embodiments, processing logic further performs one or more testing processes using the new cache data node cluster and the existing cache data node cluster (processing block 516). As discussed above, the testing can include simultaneous testing in which an equal volume of traffic is handled by an existing distributed cache data storage system and a new distributed cache data storage system to determine whether they systems have similar functional indicators (e.g., similar failure rates, similar latency, etc.). The testing can also include a pressure test to ensure a new distributed cache data storage system can handle a full processing volume. Both such tests are discussed above in greater detail. Processing logic then transmits a testing results notification to the control plane indicative of a failure or success of a warming of the existing cache data node cluster (processing block 518). Based on these results, processing logic of the control plane can decide whether or not to let a new distributed cache data storage system go live and decommission the old distributed cache data storage system.

Figure 6:
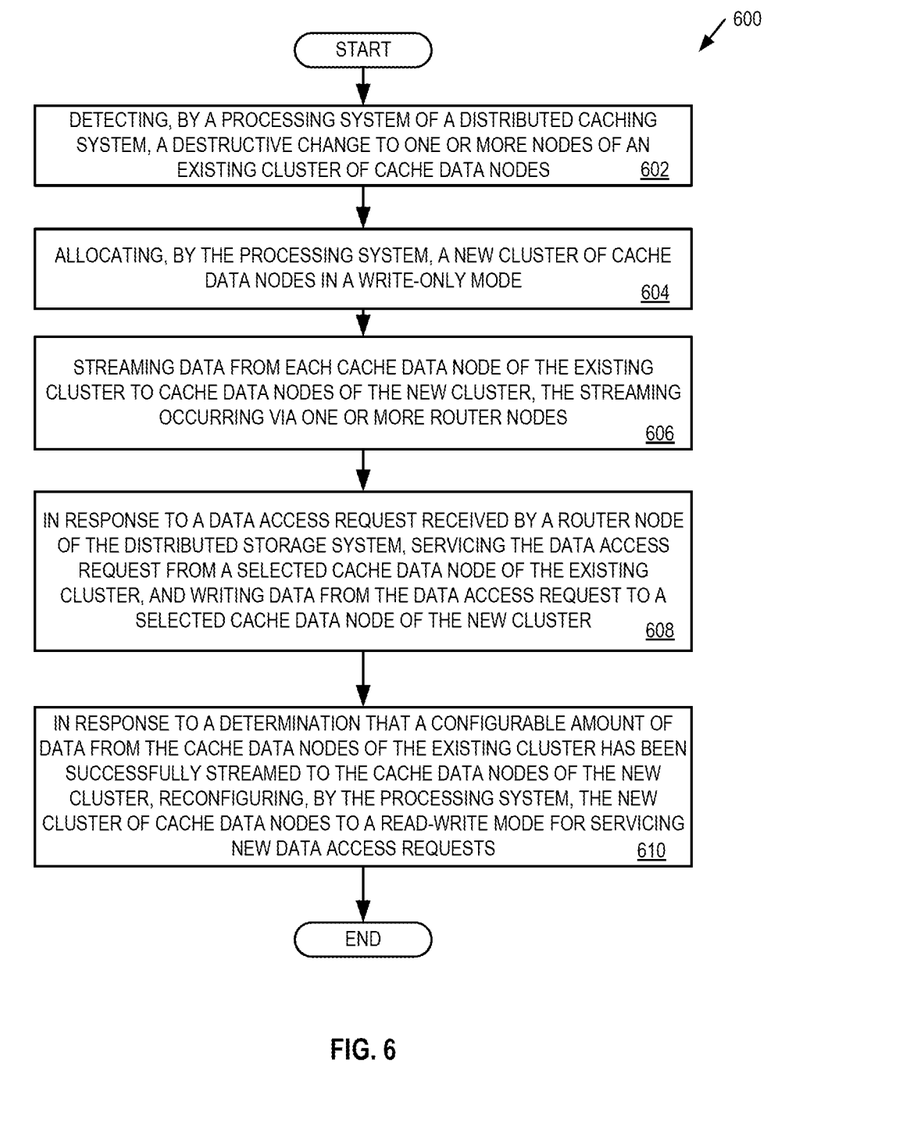
FIG. 6 is a flow diagram of another embodiment of a method for cache warming in a distributed storage system.

FIG. 6 is a flow diagram of another embodiment of a method 600 for cache warming in a distributed storage system. The method 600 is performed by processing logic that may comprise hardware (circuitry, dedicated logic, etc.), software (such as is run on a general purpose computer system or a dedicated machine), firmware, or a combination. In embodiments, the process is performed by a distributed caching system of a service provider system.

Referring to FIG. 6, processing logic begins by detecting, by a processing system of a distributed caching system, a destructive change to one or more nodes of an existing cluster of cache data nodes (processing block 602). The detection of the destructive change enables processing logic to determine when a disruption may be about to occur for a service system of a distributed service system. The disruption, as discussed herein, is a disruption to the distributed cache data storage used by such a service system, which impacts the proper and timely functioning of that system, as well as other service systems that rely on the service system subject to the disruption. Therefore, detecting such a potential destructive change, and providing a zero downtime approach addressing the disruption provides for more reliable operation of the service systems of a distributed service system by ensuring continued servicing of data access requests before, during, and after the destructive event via the zero downtime cache warming process discussed herein.

Processing logic allocate, by the processing system, a new cluster of cache data nodes in a write-only mode (processing block 604), and streams data from each cache data node of the existing cluster to cache data nodes of the new cluster, the streaming occurring via one or more router nodes (processing block 606). The allocation of a new cluster in a write-only mode and then the streaming of data from an existing cluster to the new cluster enables the new cluster's nodes to receive and store the data of the old cluster. Furthermore, by being in a write-only mode and configured to receive the write requests from a specific port of a router node, data security can be enforced during the streaming process to avoid erroneous and/or nefarious attempts to write data to a new cluster that do not originate from an approved network location, such as a warming port.

In response to a data access request received by a router node of the distributed storage system, processing logic servicing the data access request from a selected cache data node of the existing cluster, and writing data from the data access request to a selected cache data node of the new cluster (processing block 608). Since the existing cluster services new data requests (e.g., received after the start of the warming process), and the new cluster also services data access requests that include data writes, then both systems are able to maintain a current state of data during the warming process. Furthermore, because both the existing cluster and new cluster exist during the warming process, and both are updated to reflect a current state of data, a full and complete warming can be performed with zero downtime and disruption to the service systems that rely on the cached data storage. Additionally, the old cluster's continued operation during the warming process improves reliability in servicing data access requests during the warming process by eliminating the need to access persistent storage, and thus minimizing the number of network hops over which data access requests and responses are communicated. The minimization of the number of network hops enabled by the zero downtime cache warming process discussed herein therefore increases reliability of the responses to the data access request, reduces latency of response time, and reduces bandwidth consumption by ensuring longer network routes are not used to service data access requests (e.g., thereby consuming more network bandwidth).

In response to a determination that a configurable amount of data from the cache data nodes of the existing cluster has been successfully streamed to the cache data nodes of the new cluster, reconfiguring, by the processing system, the new cluster of cache data nodes to a read-write mode for servicing new data access requests (processing block 610). That is, once a sufficient amount of data is transferred to a new cluster, the new cluster can take over for the old cluster. The new cluster, which is provided with sufficient and accurate data, is therefore able to begin operation to prevent service disruptions that would result from the destructive event detected with respect to the node(s) of the existing cluster. Therefore, the new cluster maintains high availability of data access, and ensures reliability of the data and access to that data within the new cluster.

Figure 7:
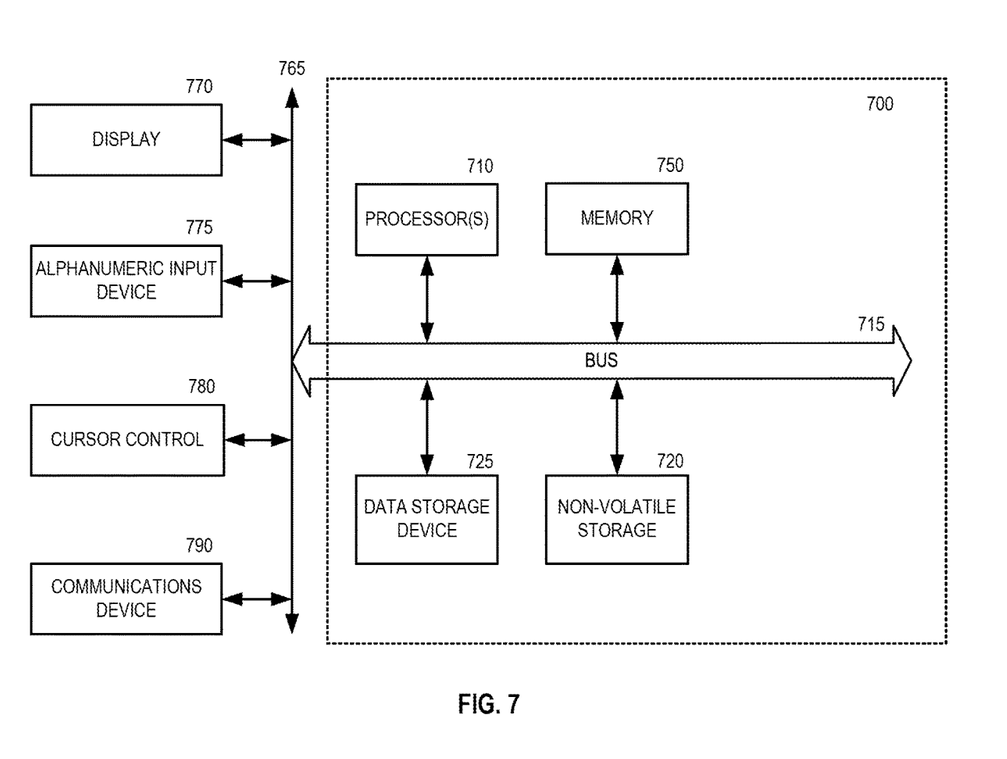
FIG. 7 is one embodiment of a computer system that may be used to support the systems and operations discussed herein.

FIG. 7 is one embodiment of a computer system that may be used to support the systems and operations discussed herein. For example, the computer system illustrated in FIG. 7 may be used by a commerce platform system, a merchant development system, merchant user system, etc. It will be apparent to those of ordinary skill in the art, however that other alternative systems of various system architectures may also be used.

The data processing system illustrated in FIG. 7 includes a bus or other internal communication means 715 for communicating information, and a processor 710 coupled to the bus 715 for processing information. The system further comprises a random access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a light emitting diode (LED) display or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a touchpad, mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The embodiments discussed herein may also be embodied in a handheld or portable device containing a subset of the computer hardware components described above. For example, the handheld device may be configured to contain only the bus 715, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for cache warming in a distributed storage system, comprising:

detecting, by a processing system of a distributed caching system, a destructive change to one or more nodes of an existing cluster of cache data nodes;

allocating, by the processing system, a new cluster of cache data nodes in a write-only mode;

streaming data from each cache data node of the existing cluster to cache data nodes of the new cluster, the streaming occurring via one or more router nodes;

in response to a data access request received by a router node of the distributed storage system, servicing the data access request from a selected cache data node of the existing cluster, and writing data from the data access request to a selected cache data node of the new cluster;

in response to a determination that a configurable amount of data from the cache data nodes of the existing cluster has been successfully streamed to the cache data nodes of the new cluster, reconfiguring, by the processing system, the new cluster of cache data nodes to a read-write mode for servicing new data access requests;

performing one or more tests on the cache data nodes of the new cluster to validate one or more metrics associated with servicing the new data access requests by the new cluster; and in response to a validation of the one or more metrics indicating passing of the one or more tests, shutting down the existing cluster of cache data nodes.

2. The method of claim 1, further comprising:

generating a notification, by the cache data nodes of the new cluster for the processing system, of a successful warming of the cache data nodes of the new cluster.

3. The method of claim 1, further comprising:

in response to a non-validation of one or more of the one or more metrics indicating failure of one or more of the one or more tests, shutting down the new cluster;

allocating, by the processing system, a second new cluster of cache data nodes in a write-only mode; and performing a process to warm data of the second new cluster of cache data nodes from the data of the cache data nodes of the existing cluster.

4. The method of claim 1, wherein performing the one or more tests on the cache data nodes of the new cluster further comprises:

randomly distributing for a period of time, by router nodes, data access requests between the cache data nodes of the existing cluster and the cache data nodes of the new cluster for servicing of the data access requests received during the period of time;

comparing one or more metrics indicative of the servicing of the data access requests by the cache data nodes of the existing cluster and the cache data nodes of the new cluster during the period of time, the one or more metrics comprising one or more of a failure rate, a data access latency, or cache hit rate;

when the metrics associated with the cache data nodes of the new cluster servicing data access requests during the time period match or exceed metrics associated with the cache data nodes of the existing cluster servicing data access requests during the time period, validating the one or more metrics to enable the shutting down of the existing cluster of cache data nodes.

5. The method of claim 1, wherein performing the one or more tests on the cache data nodes of the new cluster further comprises:

reconfiguring the cache data nodes of the existing cluster to a write-only mode;

servicing, during a period of time, new data access requests from the cache data nodes of the new cluster, wherein data to be written by the data access requests is written to one or more of the cache data nodes of the existing cluster;

measuring one or more metrics associated with the cache data nodes of the new cluster servicing the new data access requests during the period of time, the one or more metrics comprising a failure rate, a cache miss rate, or latency; and when the metrics associated with the cache data nodes of the new cluster servicing data access requests during the time period satisfy one or more predefined thresholds, validating the one or more metrics to enable the shutting down of the existing cluster of cache data nodes.

6. The method of claim 1, wherein performing the one or more tests on the cache data nodes of the new cluster further comprises:

performing a first test comprising:

randomly distributing for a first period of time, by router nodes, data access requests between the cache data nodes of the existing cluster and the cache data nodes of the new cluster for servicing of the data access requests received during the period of time, comparing one or more first metrics indicative of the servicing of the data access requests by the cache data nodes of the existing cluster and the cache data nodes of the new cluster during the first period of time, the one or more first metrics comprising one or more of a first failure rate, a data access latency, or cache hit rate, and when the metrics associated with the cache data nodes of the new cluster servicing data access requests during the time period match or exceed metrics associated with the cache data nodes of the existing cluster servicing data access requests during the time period, validating the one or more first metrics and passing the first test;

in response to passing the first test, performing a second test comprising:

reconfiguring the cache data nodes of the existing cluster to a write-only mode, servicing, during a second period of time after the first period of time, new data access requests from the cache data nodes of the new cluster, wherein data to be written by the data access requests are written to one or more of the cache data nodes of the existing cluster, measuring one or more second metrics associated with the cache data nodes of the new cluster servicing the new data access requests during the second period of time, the one or more metrics comprising a second failure rate, a cache miss rate, or cache hit rate, and when the one or more second metrics associated with the cache data nodes of the new cluster servicing data access requests during the second time period satisfy one or more predefined thresholds, validating the one or more second metrics and passing the second test; and in response to passing the second test, performing the shutting down of the existing cluster of cache data nodes.

7. The method of claim 1, wherein the data is streamed via a second port of each the one or more router nodes, and where data access requests are processed by the one or more router nodes in response to that data access requests being received via a first port of each the one or more router nodes, wherein the first port and the second port are different ports.

8. The method of claim 1, further comprising:

initiating, by a warming tool at each cache data node of the existing cluster, the streaming of the data from each cache data node of the existing cluster to cache data nodes of the new cluster.

9. The method of claim 8, wherein the warming tool comprises a service executed by said each cache data node of the new cluster to process data streamed to said each cache data node of the new cluster from the existing cluster.

10. The method of claim 1, wherein the processing system executes a control plane service that manages the distributed storage system.

11. A non-transitory machine readable medium, having instructions stored thereon, which when executed by a processing system of a distributed caching system, cause the processing system to perform operations for cache warming in a distributed storage system, comprising:

detecting, by the processing system of the distributed caching system, a destructive change to one or more nodes of an existing cluster of cache data nodes;

allocating, by the processing system, a new cluster of cache data nodes in a write-only mode;

streaming data from each cache data node of the existing cluster to cache data nodes of the new cluster, the streaming occurring via one or more router nodes;

in response to a data access request received by a router node of the distributed storage system, servicing the data access request from a selected cache data node of the existing cluster, and writing data from the data access request to a selected cache data node of the new cluster;

in response to a determination that a configurable amount of data from the cache data nodes of the existing cluster has been successfully streamed to the cache data nodes of the new cluster, reconfiguring, by the processing system, the new cluster of cache data nodes to a read-write mode for servicing new data access requests;

performing one or more tests on the cache data nodes of the new cluster to validate one or more metrics associated with servicing the new data access requests by the new cluster; and in response to a validation of the one or more metrics indicating passing of the one or more tests, shutting down the existing cluster of cache data nodes.

12. The non-transitory machine readable medium of claim 11, further comprising:

in response to a non-validation of one or more of the one or more metrics indicating failure of one or more of the one or more tests, shutting down the new cluster;

allocating, by the processing system, a second new cluster of cache data nodes in a write-only mode; and performing a process to warm data of the second new cluster of cache data nodes from the data of the cache data nodes of the existing cluster.

13. The non-transitory machine readable medium of claim 11, wherein performing the one or more tests on the cache data nodes of the new cluster further comprises:

performing a first test comprising:

randomly distributing for a first period of time, by router nodes, data access requests between the cache data nodes of the existing cluster and the cache data nodes of the new cluster for servicing of the data access requests received during the period of time, comparing one or more first metrics indicative of the servicing of the data access requests by the cache data nodes of the existing cluster and the cache data nodes of the new cluster during the first period of time, the one or more first metrics comprising one or more of a first failure rate, a data access latency, or cache hit rate, and when the metrics associated with the cache data nodes of the new cluster servicing data access requests during the time period match or exceed metrics associated with the cache data nodes of the existing cluster servicing data access requests during the time period, validating the one or more first metrics and passing the first test;

in response to passing the first test, performing a second test comprising:

reconfiguring the cache data nodes of the existing cluster to a write-only mode, servicing, during a second period of time after the first period of time, new data access requests from the cache data nodes of the new cluster, wherein data to be written by the data access requests are written to one or more of the cache data nodes of the existing cluster, measuring one or more second metrics associated with the cache data nodes of the new cluster servicing the new data access requests during the second period of time, the one or more metrics comprising a second failure rate, a cache miss rate, or latency, and when the one or more second metrics associated with the cache data nodes of the new cluster servicing data access requests during the second time period satisfy one or more predefined thresholds, validating the one or more second metrics and passing the second test; and in response to passing the second test, performing the shutting down of the existing cluster of cache data nodes.

14. The non-transitory machine readable medium of claim 11, wherein the data is streamed via a second port of each the one or more router nodes, and where data access requests are processed by the one or more router nodes in response to that data access requests being received via a first port of each the one or more router nodes, wherein the first port and the second port are different ports.

15. The non-transitory machine readable medium of claim 11, further comprising:

initiating, by a warming tool at each cache data node of the existing cluster, the streaming of the data from each cache data node of the existing cluster to cache data nodes of the new cluster.

16. A distributed caching system, comprising:

a memory; and a processing system coupled with the memory configured to:

detect a destructive change to one or more of data nodes of an existing cluster of cache data nodes, allocating a new cluster of cache data nodes in a write-only mode, stream data from each cache data node of the existing cluster to cache data nodes of the new cluster, the streaming occurring via one or more router nodes, in response to a data access request received by a router node of the distributed storage system, service the data access request from a selected cache data node of the existing cluster, and write data from the data access request to a selected cache data node of the new cluster, in response to a determination that a configurable amount of data from the cache data nodes of the existing cluster has been successfully streamed to the cache data nodes of the new cluster, reconfigure the new cluster of cache data nodes to a read-write mode for servicing new data access requests, performing one or more tests on the cache data nodes of the new cluster to validate one or more metrics associated with servicing the new data access requests by the new cluster, and in response to a validation of the one or more metrics indicating passing of the one or more tests, shutting down the existing cluster of cache data nodes.

* * * * *